(12) United States Patent
Naffziger et al.

(10) Patent No.: US 7,937,563 B2
(45) Date of Patent: May 3, 2011

(54) VOLTAGE DROOP MITIGATION THROUGH INSTRUCTION ISSUE THROTTLING

(75) Inventors: Samuel D. Naffziger, Fort Collins, CO (US); Michael Gerard Butler, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 388 days.

(21) Appl. No.: 12/127,514

(22) Filed: May 27, 2008

(65) Prior Publication Data

US 2009/0300329 A1 Dec. 3, 2009

(51) Int. Cl.
*G06F 9/30* (2006.01)
*G06F 9/40* (2006.01)
*G06F 1/00* (2006.01)
*G06F 1/26* (2006.01)
*G06F 1/32* (2006.01)

(52) U.S. Cl. ........ 712/214; 712/215; 713/300; 713/320; 713/323

(58) Field of Classification Search ........... 712/214–215
See application file for complete search history.

(56) References Cited

U.S. PATENT DOCUMENTS

| | | | |
|---|---|---|---|
| 5,712,826 A | 1/1998 | Wong et al. | |
| 5,764,089 A | 6/1998 | Partovi et al. | |

(Continued)

OTHER PUBLICATIONS

Fischer, et al; "A 90nm Variable-Frequency Clock System for a Power-Managed Itanium®-Family Processor"; Solid-State Circuits Conference, 2005. Digest of Technical Papers. ISSCC. 2005 IEEE International, Publication Date: Feb. 10-10, 2005, pp. 294-295 & 599. vol. 1, San Francisco, CA, ISSN: 0193-6530, ISBN: 0-7803-8904-2.

Karnik, et al "Scaling trends of Cosmic Rays induced Soft Errors in static latches beyond 0.18 pts" 2001 Symposium on VLSI Circuits of Technical Papers, pp. 61-62.

(Continued)

*Primary Examiner* — Eddie P Chan
*Assistant Examiner* — William B Partridge
(74) *Attorney, Agent, or Firm* — Rory D. Rankin; Meyerton, Hood, Kivlin, Kowert & Goetzel, P.C.

(57) ABSTRACT

A system and method for providing a digital real-time voltage droop detection and subsequent voltage droop reduction. A scheduler within a reservation station may store a weight value for each instruction corresponding to node capacitance switching activity for the instruction derived from pre-silicon power modeling analysis. For instructions picked with available source data, the corresponding weight values are summed together to produce a local current consumption value and this value is summed with any existing global current consumption values from corresponding schedulers of other processor cores yielding an activity event. The activity event is stored. Hashing functions within the scheduler are used to determine both a recent and an old activity average using the calculated activity event and stored older activity events. Instruction issue throttling occurs if either a difference between the old activity average and the recent activity average exceed a first threshold or the recent activity average exceeds a second threshold.

17 Claims, 5 Drawing Sheets

U.S. PATENT DOCUMENTS

| | | | |
|---|---|---|---|
| 5,917,355 | A | 6/1999 | Klass |
| 6,278,308 | B1 | 8/2001 | Partovi et al. |
| 6,311,261 | B1 * | 10/2001 | Chamdani et al. ............... 712/23 |
| 6,597,620 | B1 | 7/2003 | McMinn |
| 6,611,435 | B2 | 8/2003 | Kumar |
| 7,301,373 | B1 | 11/2007 | Bailey et al. |
| 7,409,568 | B2 | 8/2008 | Tam |
| 7,454,637 | B2 | 11/2008 | Er |
| 7,647,518 | B2 * | 1/2010 | Chang et al. .................. 713/320 |
| 2006/0206740 | A1 * | 9/2006 | Hurd ............................. 713/322 |

OTHER PUBLICATIONS

Goel, et al "Low-Overhead Design of Soft-Error-Tolerant Scan Flip-Flops with Enhanced-Scan Capability" 2006 Asia and South Pacific Conference on Design Automation, Jan. 24-27, 2006 pp. 665-670.

Krishnamohan, et al "A Highly-Efficient Techniques for Reducing Soft Errors in Static CMOS Circuits" pp. 126-131, 2004 IEEE International Conference on Computer Design (ICCD'04), 2004.

\* cited by examiner

VOLTAGE DROOP MITIGATION THROUGH INSTRUCTION ISSUE THROTTLING

BACKGROUND OF THE INVENTION

1. Field of the Invention

This invention relates to electronic circuits, and more particularly, to an efficient method for measuring current consumption time rate of change to prevent voltage droop.

2. Description of the Relevant Art

Both power consumption and voltage droop of modern integrated circuits (IC's) has become an increasing design issue with each generation of semiconductor chips. IC power dissipation and voltage droop constraints are not only an issue for portable computers and mobile communication devices, but also for high-performance superscalar microprocessors, which may include multiple processor cores, or cores, and multiple pipelines within a core. The geometric dimensions of devices and metal routes on each generation of cores are decreasing. Superscalar designs increase the density of integrated circuits on a die with multiple pipelines, larger caches, and more complex logic. Therefore, the number of nodes and buses that may switch per clock cycle significantly increases.

Cross-capacitance effects grow with decreasing geometric dimensions. Cross-capacitance increases the power consumption and noise effects on the chip. Also as IC's have achieved greater operational frequencies, these circuits again increase power consumption and have become more sensitive to parasitic inductance effects that also result from decreasing geometric dimensions. Some origins of parasitic inductance include bond wires, IC package leads, external supply lines, and wide buses.

Parasitic inductance increase transmission line effects on a chip such as ringing and reduced propagation delays. Also, a simultaneous switching of a wide bus may cause a significant voltage drop if a supply pin served all of the line buffers on the bus. This voltage droop, $\Delta V$, is proportional to the expression L di/dt, wherein L is the parasitic inductance and di/dt is the time rate of change of the current consumption. If a large number of nodes in addition to buses switched simultaneously, a significant voltage drop may occur. Now a node that holds a logic high value may experience a voltage droop that reduces its voltage value below a minimum threshold. For memories and latches without recovery circuitry, stored values may be lost.

One manner to reduce voltage droop is to reduce the operational frequency of the IC. Although, this method may reduce the overall current consumption, a simultaneous switching of numerous nodes and signal lines still may reduce a node's voltage value to below a minimum threshold. Therefore, this reduction in performance still does not protect against voltage droop. The node capacitance switching may decrease for certain blocks and/or units in the chip by disabling the clock to these areas with qualified enable signals during periods of non-use. However, during use of these units, again, simultaneous switching of numerous nodes and signal lines may occur and the voltage droop problem still exists.

Another method for reducing voltage droop, $\Delta V$, is reducing parasitic inductance, L, such as placing an external capacitor between the supply leads. This external capacitance creates a passive bypass that reduces the supply line oscillation due to external inductances. However, it does not significantly reduce the oscillation caused by internal inductances. Another manner to reduce inductance effects includes placing an on-chip capacitor between the internal supply leads. The capacitor acts as a bypass in the same manner as an external capacitor. However, in order to be effective, the internal capacitor must be very large, which requires a significant portion of the chip area. This manner is undesirable when minimization of the die area is needed.

Other methods to reduce parasitic inductance effects include separating power pins for input/output (I/O) pads and for the core, placing multiple supply and ground reference pins over the die, and distribute gate oxide capacitors across the die, especially under data buses. Again, these methods may not be desirable when die minimization is required.

The above methods are passive. Active compensation approaches can also be used, and are broken down into proactive and reactive. Reactive methods detect and reduce the time rate of change of current consumption, di/dt. In order to be beneficial and to prevent a voltage droop from lowering a node voltage below a minimum threshold, these reactive methods must detect and initiate a current reduction within a predetermined time window. There are reactive methods that use analog detection and a subsequent frequency reduction in order to decrease parasitic inductance effects. However, frequency reduction does not remove the electrical problems as described above for operational frequency reduction. Also, design complexity and on-chip area increase with a dynamic frequency control system and associated chip level interface issues.

Further, a di/dt detector and subsequent response mechanism are most beneficial in a computer system when they are deterministic. In other words, the detector and mechanism should provide the same results, or frequency changes, from part-to-part, system-to-system, and run-to-run. The reason for this requirement is Original Equipment Manufacturers (OEMs) using the processor in one of their systems need to provide performance guarantees to customers. Customers and OEMs need to replicate the benchmarks and performance measures at different times and in different locations. If this replication cannot be done within a tight tolerance (i.e. +/−1.5%), then the detector and response mechanism need to be turned off. Now the detector and mechanism take up area on the die without performing useful work to improve performance and voltage droop reduction.

Analog sensors, such as temperature sensors and/or an ammeter, are able to provide accurate power estimations, and thus, current consumption, but all of them are environment dependent. Variations in fabrication processes, ambient temperature, power supplies, and the quality of the heat removal solution alter the measurements of analog sensors.

In view of the above, efficient methods and mechanisms for providing a proactive, digital real-time voltage droop detection and subsequent voltage droop reduction are desired.

SUMMARY OF THE INVENTION

Systems and methods for providing a digital real-time voltage droop detector and subsequent voltage droop reduction are contemplated.

In one embodiment, a system is provided comprising control logic to pick a set of a maximum M instructions, within an array of a reservation station, that have source data. Each instruction is associated with a predetermined weight value stored in a weight table in a scheduler corresponding to node capacitance switching activity for the instruction derived from pre-silicon power modeling analysis. The corresponding weights are summed to produce a local current consumption value. This value may be summed with existing global current consumption values from corresponding schedulers of other processor cores of a multi-core processor to produce an activity event. The activity event may be stored in a first-in first-out (FIFO) queue. Both a recent and an old activity average are determined with hashing functions using the activity event and queue entries. The scheduler will send control signals to throttle instruction issue if either a difference between the old activity and the recent activity is greater than a first threshold or the recent activity is greater than a second threshold.

In another aspect of the invention, a method is provided to, in response to either a recent or old current consumption activity time rate of change exceeds corresponding thresholds, throttle instruction issue. There is a choosing of a maximum of M instructions within an array of a reservation station with required source data. A predetermined weight value corresponding to node capacitance switching activity for the instruction derived from pre-silicon power modeling analysis is associated with each instruction. An accumulation of the corresponding weights produces a local current consumption value. This value may be further summed with existing global current consumption values from corresponding schedulers of other processor cores of a multi-core processor to produce an activity event. The activity event may be stored in a FIFO queue. Hashing functions may be used to determine both a recent and an old activity average using the activity event and queue entries. Throttling of instruction issue occurs if either a difference between the old activity and the recent activity is greater than a first threshold or the recent activity is greater than a second threshold.

In another aspect of the invention, a digital voltage droop anticipator is provided within a scheduler comprising an interface configured to receive a set of a maximum M instructions, within an array of a reservation station, that have required source data. A weight table within the detector stores a weight value corresponding to node capacitance switching activity for the instruction derived from pre-silicon power modeling analysis. An accumulator sums the corresponding weights to produce a local current consumption value. This value may be further summed with existing global current consumption values from corresponding schedulers of other processor cores of a multi-core processor to produce an activity event. The activity event may be stored in an event table, which is a FIFO queue. Hashing functions within the detector may be used to determine both a recent and an old activity average using the calculated activity event and older activity event values stored in the event table. Control signals are asserted for throttling instruction issue if either a difference between the old activity average and the recent activity average is greater than a first threshold or the recent activity average is greater than a second threshold.

Figure 1:
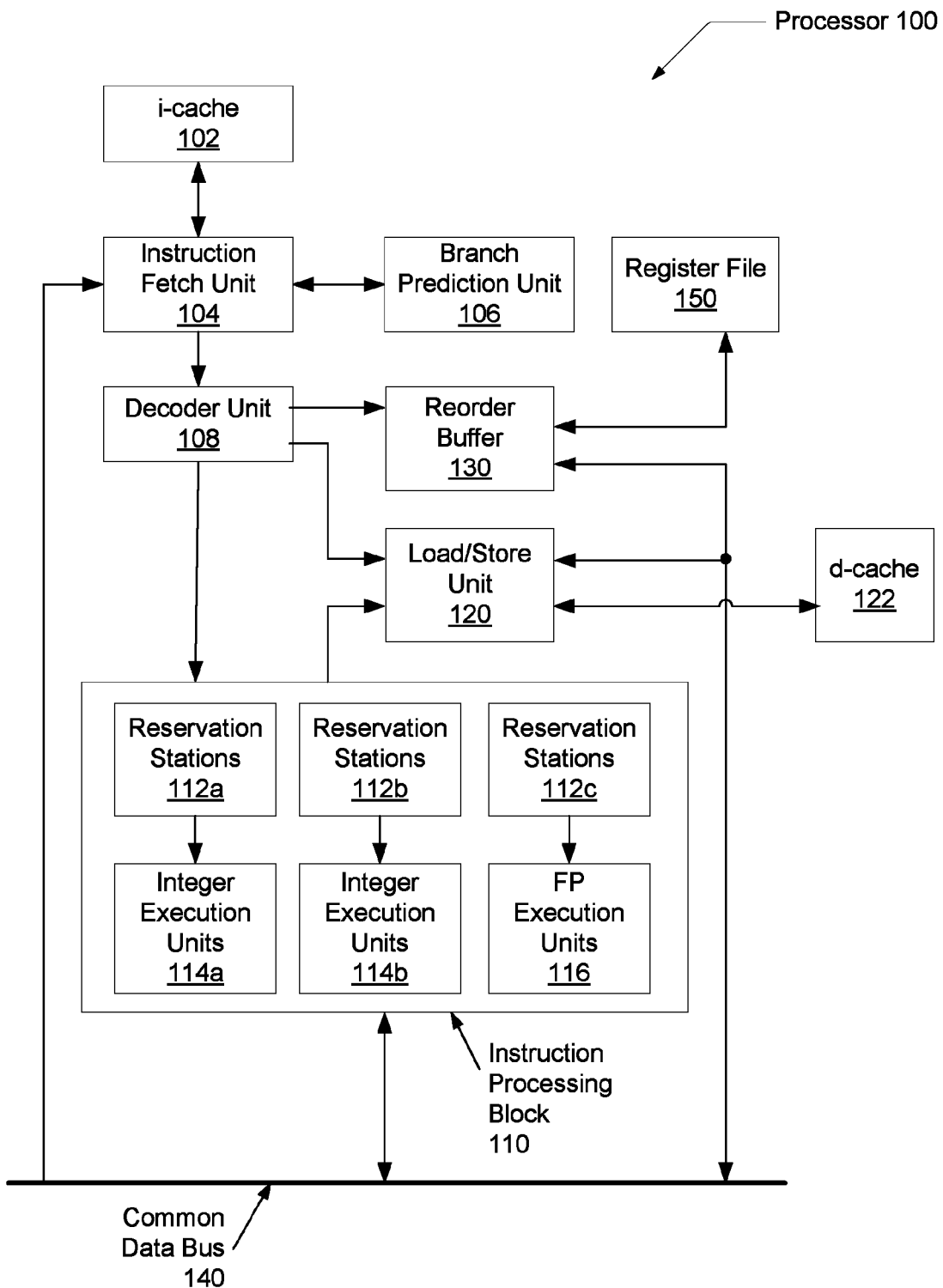
FIG. 1 is a general block diagram illustrating one embodiment of a processor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of a processor core 100 that performs out-of-order execution is shown. An instruction-cache (i-cache) 102 may store instructions for a software application. The instruction fetch unit (IFU) 104 may fetch multiple instructions from the i-cache 102 per clock cycle if there are no i-cache misses. The IFU 104 may include a program counter (PC) register that holds a pointer to an address of the next instructions to fetch from the i-cache 102. A branch prediction unit 106 may be coupled to the IFU 104. Unit 106 may be configured to predict information of instructions that change the flow of an instruction stream from executing a next sequential instruction. An example of prediction information may include a 1-bit value comprising a prediction of whether or not a condition is satisfied that determines if a next sequential instruction should be executed or an instruction in another location in the instruction stream should be executed next. Another example of prediction information may be an address of a next instruction to execute that differs from the next sequential instruction. The determination of the actual outcome and whether or not the prediction was correct may occur in a later pipeline stage. Also, in an alternative embodiment, IFU 104 may comprise unit 106, rather than have the two be implemented as two separate units.

The decoder unit 108 decodes the opcodes of the multiple fetched instructions. Alternatively, the instructions may be divided into micro-instructions, or micro-ops. As used herein, the terms "instructions" and "micro-ops" are interchangeable as the invention may be used with an architecture that utilizes either implementation. The decoder may allocate entries in an in-order retirement queue, such as reorder buffer 130, in reservation stations (RS) 112a-112c in instruction processing block 110, and in a load/store unit 120. As used herein, elements referred to by a reference numeral followed by a letter may be collectively referred to by the numeral alone. For example, RS 112a-112c may be collectively referred to as RS 112. In one embodiment, the allocation of entries in RS 112 is referred to as dispatch. The RS 112 may act as an instruction queue where instructions wait until their operands become available. When operands are available and hardware resources are also available, an instruction may be issued out-of-order from the RS 112 to the integer execution units 114 and floating point execution unit 116 or the load/store unit 120. The execution units 114 and 116 may include arithmetic logic units (ALU's) for computational calculations such as addition, subtraction, multiplication, division, and square root. Logic may be included to determine an outcome of a control flow instruction and to compare the calculated outcome with the predicted value. If there is not a match, a misprediction occurred, and the subsequent instructions after the control flow instruction need to be removed and a new fetch with the correct PC value needs to be performed.

The load/store unit 120 may include queues and logic to execute a memory access instruction. Also, verification logic may reside in the load/store unit 120 to ensure a load instruction received forwarded data, or bypass data, from the correct youngest store instruction.

Results from the execution units 114 and 116 and the load/store unit 120 may be presented on a common data bus 140. The results may be sent to the reorder buffer 130. Here, an instruction that receives its results, is marked for retirement, and is head-of-the-queue may have its results sent to the register file 150. The register file 150 may hold the architectural state of the general-purpose registers of processor 100. In one embodiment, register file 150 may contain 32 32-bit registers. Then the instruction in the reorder buffer may be retired in-order and its head-of-queue pointer may be adjusted to the subsequent instruction in program order.

The results on the common data bus 140 may be sent to the RS 112 in order to forward values to operands of instructions waiting for the results. When these waiting instructions have values for their operands and hardware resources are available to execute the instructions, they may be issued out-of-order from the RS 112 to the appropriate resources in the execution units 114 and 116 or the load/store unit 120. Results on the common data bus 140 may be routed to the IFU 104 and branch prediction unit 106 in order to update branch prediction information and/or the PC value.

The instruction-issue scheduling mechanism, which includes instruction-issue throttling for voltage droop reduction, may be implemented in any out-of-order execution system utilizing one or more RS 112 for waiting instructions. In the described embodiment, RS 112 is implemented such that a plurality of instructions in one clock cycle may be waiting for all necessary resources required for dispatch to an execution unit.

Figure 2:
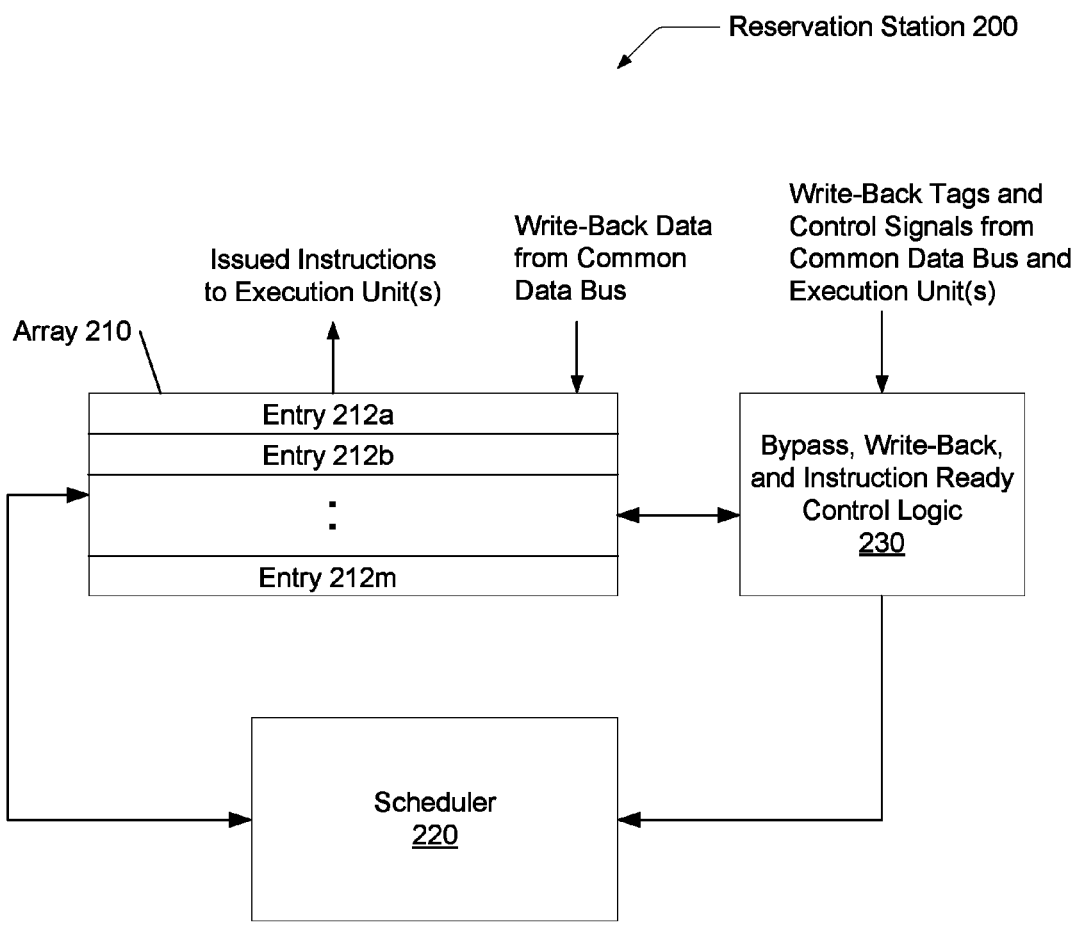
FIG. 2 is a general block diagram illustrating one embodiment of a reservation station.

In FIG. 2, the instructions dispatched to reservation station 200 and the instruction's associated data are stored in entries 212 of array 210. The associated data in entry 212 may include the opcode or processor internal payload information, source operands, valid bits for the source data, identifiers indicating the necessary functional unit for a given instruction to be dispatched to. The embodiment shown has instructions written into RS 112 with control bits indicating a particular execution unit to be dispatched to. Alternatively, it is possible to couple together the various schedulers such that a data-ready instruction capable of executing on multiple execution units may be scheduled to the first available unit.

Coupled to array 210 is scheduler 220. Scheduler 220 investigates array 210 looking for data-ready instructions to pick and later issue. An instruction is data-ready when all valid source operand data has been determined by the reservation station and an appropriate functional unit is available. Valid source data is determined either by receipt of the data or upon receiving information that the data will be ready in time for scheduling.

Scheduler 220 is informed of ready instructions by receiving notification from control logic 230. Control logic 230 receives input signals that indicate the availability of functional units, the activation of valid bits for source data from array 210, and bypass, or data forwarding, information detected by tag matching for needed data being concurrently written back.

Below, techniques are presented to digitally estimate the current consumption in real-time, record both a recent and an old current consumption history, detect from the histories a possible oncoming voltage droop, and reduce current consumption through instruction issue throttling in order to prevent a voltage droop. These techniques need to avoid both an over-response and a late response. While executing an application or applications, if the real-time current consumption of a core is both known and conveyed to an instruction issue scheduler, then the scheduler may alter the number of instructions issued in a clock cycle to functional units in order to decrease power consumption, and thus current consumption, during high power consumption periods which may lead to voltage droop.

Real-time estimation of power consumption may be achieved by measuring the switching capacitance on a die during a particular clock cycle. A node capacitance, Cac, comprises both the switched, or ac, capacitance, and the effective capacitance resulting from crossover current. For a given part, leakage current is fixed when operation has reached the temperature limit. This leakage value can be accounted for by a fused-in power offset based on measurements at test time. Attempts to take advantage of temperature induced variations in leakage current is not encouraged due to repeatability reasons discussed below. The current consumption may be correlated to the power consumption of the chip. Therefore, what is needed in order to obtain a real-time estimation of the chip's power consumption is the operational supply voltage, which is set digitally, the operational frequency, which is known, the fused-in leakage value found during testing, and a measurement of the number of nodes in the design switched in a particular clock cycle along with the node capacitance, Cac. The latter term, Cac, is not a straightforward value to measure on a semiconductor chip.

In order to find Cac, a power model simulator may measure the instruction issue rate within a core or within a processor with multiple cores. Accuracy increases if the behavior of major components such as the reservation station, the reorder buffer, the physical register files, the execution units, and other, and their respective interactions are monitored. However, it is a di/dt measurement exceeding a predetermined threshold that predicts an upcoming voltage droop. Current consumption may be associated to a node switching capacitance, Cac, and a time rate of change of Cac may predict an upcoming voltage droop. Therefore, the actual Cac measurement does not have to be very accurate. It's the change in Cac over time that is significant.

Rather than find and store a Cac estimate for each instruction, a corresponding Cac value may be found for each instruction class, or group, and later these Cac values may be translated to a weight value with less granularity than the Cac values. Each instruction group may be identified by opcodes or chip internal payload information. The Cac values and corresponding translated weight values may be found during the execution of power model simulations on the IC.

For example, a power model simulator may be executed on a core over a broad set of applications in order to characterize power consumption over the die during sample intervals. In one embodiment, an initial equal weight value may be assigned to each instruction or instruction group. In order to determine this initial value, a particular application is executed on the pre-silicon core and a sum of instructions or groups in a particular clock cycle or sample interval is recorded. The number of executed instructions is recorded for each sampling period. The actual power estimation for this sample interval found from the execution of the power model is used to determine an actual Cac value. This actual Cac is divided by the total sum of instruction groups over the sample interval. This derived value may be the equal initial weight value assigned to each instruction group.

The above steps may be performed for each application in an application suite. Each application will have its own derived initial equal weight value for the instruction groups.

The average of all of these values may be the initial equal weight value used for the sampled signals.

For each application, the calculated Cac from the initial weights will have an error term. The total error may be calculated for all of the applications. In one embodiment, this total error may be a sum of the errors for each application. In an alternative embodiment, this total error may be a sum of the squares of the errors for each application. In alternative embodiments, other equations may be used to calculate the total error.

For a particular instruction group, its corresponding initial equal weight value may be increased or decreased in a direction that diminishes the total error. If the total error stops diminishing or reaches a coarser predetermined threshold, then the current weight value for that particular instruction or instruction group is saved or translated to a predetermined coarser granularity of weight values. This value may be saved.

In an alternative embodiment, an application may be developed to execute one instruction or instruction type at a time on a core and then the corresponding power measurement, translated Cac measurement, and corresponding translated weight value is found without iterations to reduce a total error.

Figure 3A:
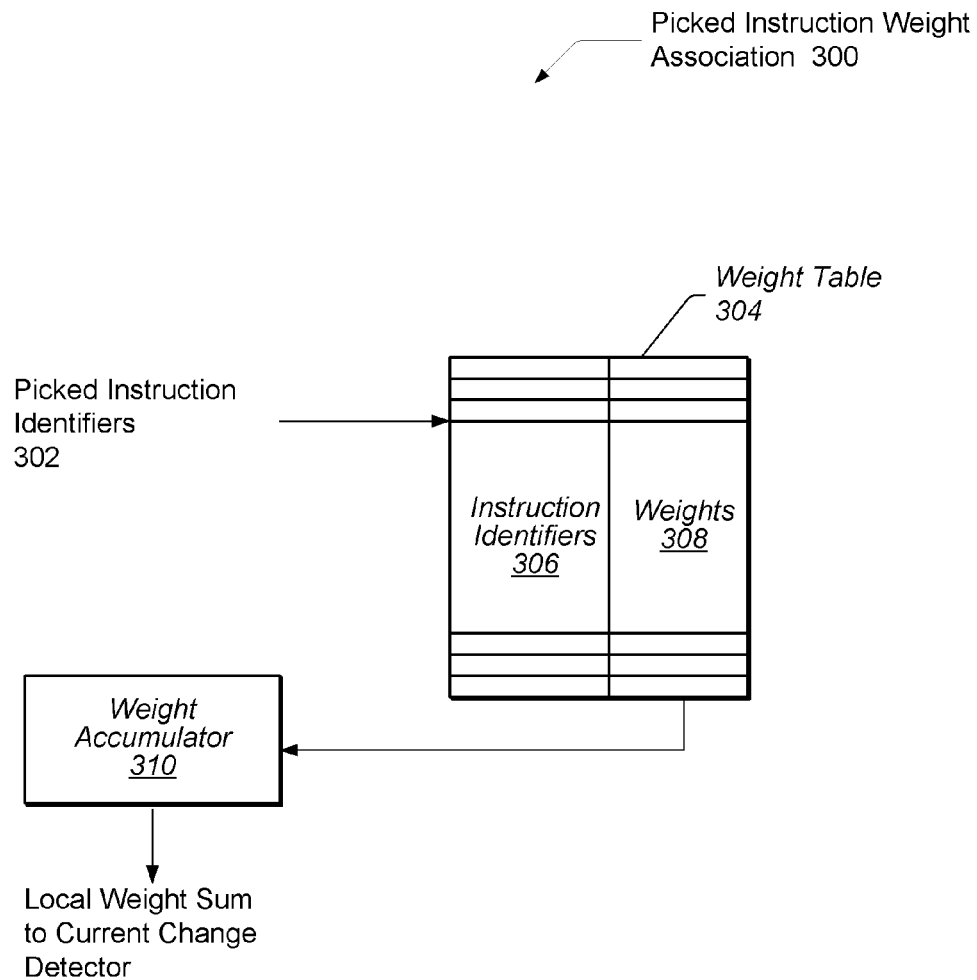
FIG. 3A is a general block diagram illustrating one embodiment of circuitry for associating picked instructions with a corresponding node capacitance switching factor.

Once instruction groups are chosen and their corresponding weight values are stored, this information may be used to digitally determine real-time current consumption of a core using a weighted average sum. Again, referring to FIG. 3A, one embodiment of circuitry 300 for picked instruction weight association is shown. In order to determine an associated weight value 308 for each instruction type, or identifier, 306 in Weight Table 304, the above mentioned power model simulator may be used to find a Cac measurement for each instruction type. This value may be translated to a weight value, which does not require a high level of granularity. Again, it is di/dt that is important. For example, in one embodiment, the granularity may include 4 different weight values. In alternative embodiments, a finer granularity may be chosen, such as 8 different weight values. If there is a large similarity in node capacitance switching, Cac, between instruction types, in other embodiments, a coarser granularity may be chosen, such as 3 different weight values. Also, instructions and their corresponding identifiers 302 may be moved from their initially assigned instruction group if their corresponding Cac measurement, and thus, their weight value, is more closely related to another instruction group.

The circuitry 300 determines a weighted average sum. This circuitry may reside in Scheduler 220. Scheduler 220 picks one or more instructions based on predetermined criteria. In one embodiment, the criteria may be the source operand data is ready. In alternative embodiments, additional qualifying criteria may be used.

The identifiers 302 for these instructions, which may include an opcode or internal payload information, may be used to index Weight Table 304. The received identifiers 302 may be compared to entries Instruction Identifiers 306 in Weight Table 304. Although the circuitry is more complex, in one embodiment, multiple identifiers may index Weight Table 304 concurrently. When an entry 306 hits, or matches, the index, its corresponding weight, which is stored in Weights 308, is conveyed to Weight Accumulator 310. Here, the received weights are summed with one another.

Figure 3B:
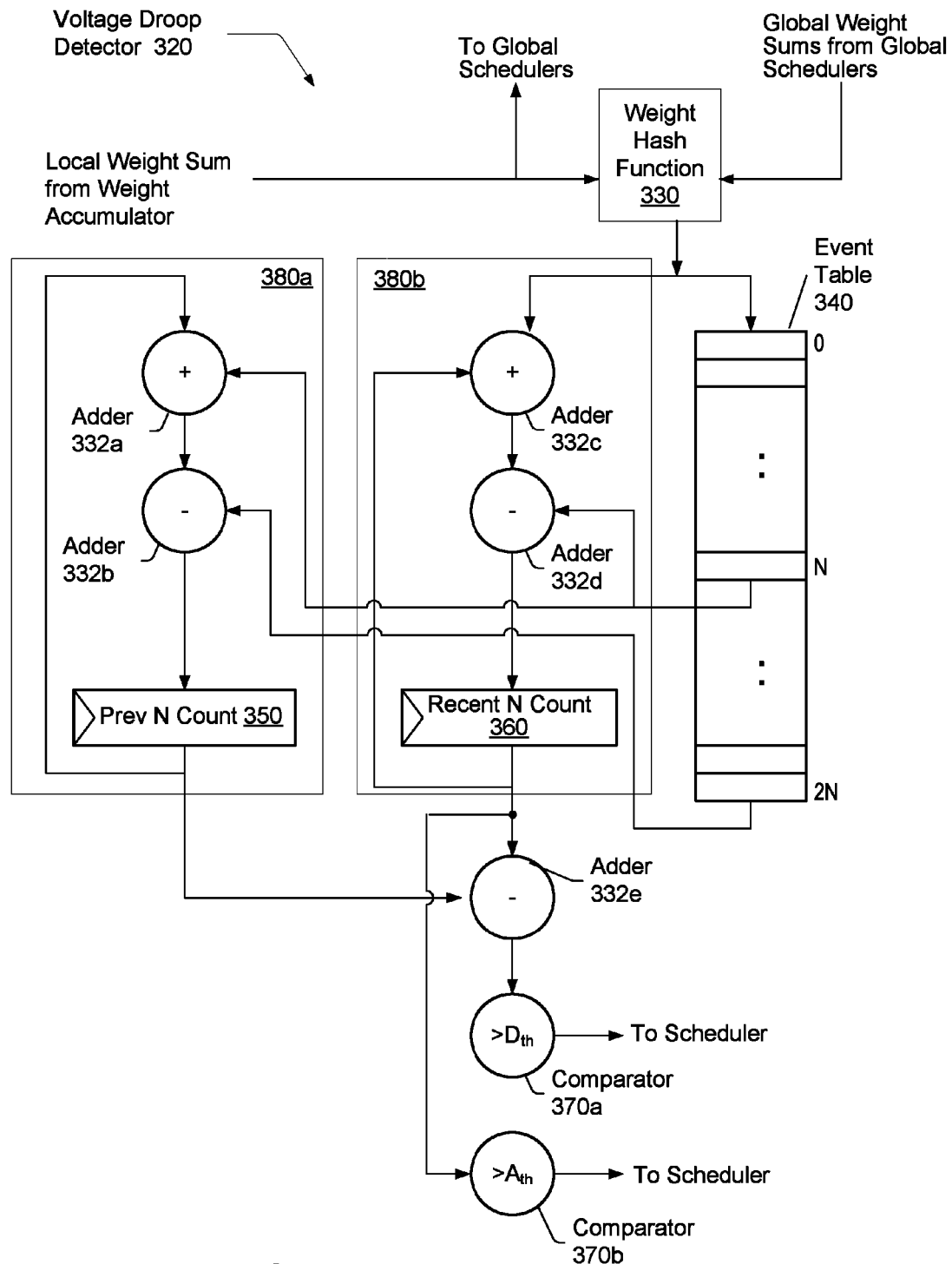
FIG. 3B is a generalized diagram illustrating one embodiment of a voltage droop detector.

FIG. 3B illustrates one embodiment of circuitry 320 for a voltage droop detector. This detector recognizes the time rate of change of current consumption of a core. The local weight sum from the weight accumulator 310 is received by a weight hash function 330. This hash function 330 combines the local weight sum with global information, such as global weight sums from other schedulers. In one embodiment, hash function 330 may be an arithmetic adder to sum the local weight sum with the global weight sums. In alternative embodiments, other functions may be used such as concatenation or inputting the sums into combinatorial logic. The local weight sum is also routed to other schedulers in order to be combined with their respective local weight sums in their respective hash functions.

The output of hash function 330 is stored in event table 340. In one embodiment, event table 340 may have 2N entries, wherein N is an integer. In one embodiment, N may correspond to an integer value of 8. Therefore, event table 340 in such an embodiment would have 16 entries. This value may be a tunable parameter during a power characterization stage of the semiconductor chip design. For example, this value may be set after iterations of a pre-silicon power modeling simulator. Event table 340 may be implemented as a first-in first-out (FIFO) queue. The recording of event histories in event table 340 may be used to determine both a recent history and an older history of current consumption. The output of hash function 330 is also routed to adder 332c within hashing function 380b where it is summed with the output of register Recent N Count 360. The combination of adder 332c, adder 332d, which performs subtraction, event table 340, and register 360 provides a hash function 380b to determine a recent history of current consumption using the assigned weight values. In order to determine an older history of current consumption, adders 332a-332b and register 350 are used within hashing function 380a. Adders 332a-332b receive inputs from event table 340, which are older events.

Adder 332e determines a difference between the recent and older histories. This difference is used to predict an upcoming voltage droop. This difference is input to comparator 370a and compared to a predetermined threshold. This threshold is a tunable value. If the difference exceeds this threshold, which predicts an upcoming voltage droop, a control signal may be asserted and sent to eligibility circuitry within Scheduler 220 in order to throttle instruction issue during the corresponding clock cycle. For example, in one embodiment, no instructions may be issued in the corresponding clock cycle. This instruction issue throttling reduces current consumption on the die and may prevent voltage droop and its negative electrical effects from occurring.

Comparator 370b receives the output of register 360 and compares this recent current consumption history value to a predetermined threshold. If the output of register 360 exceeds the threshold, a control signal may be asserted and sent to eligibility circuitry within Scheduler 220 in order to throttle instruction issue during the corresponding clock cycle. For example, in one embodiment, no instructions may be issued in the corresponding clock cycle. In an alternative embodiment, half of the instructions may be throttled. For example, for a 4-way superscalar processor, 2 instructions may be throttled, while 2 instructions may be issued if they are found to be eligible by the eligibility circuitry. The choice of which 2 instructions to throttle may be random. Alternatively, complex circuitry may be used to make a choice based on other factors such as the respective weights. In other embodiments, a finer granularity may be used such as multiple thresholds that determine if 1, 2, 3 or 4 instructions should be throttled. This instruction issue throttling reduces current consumption on the die and may prevent voltage droop and its negative electrical effects from occurring.

Figure 4:
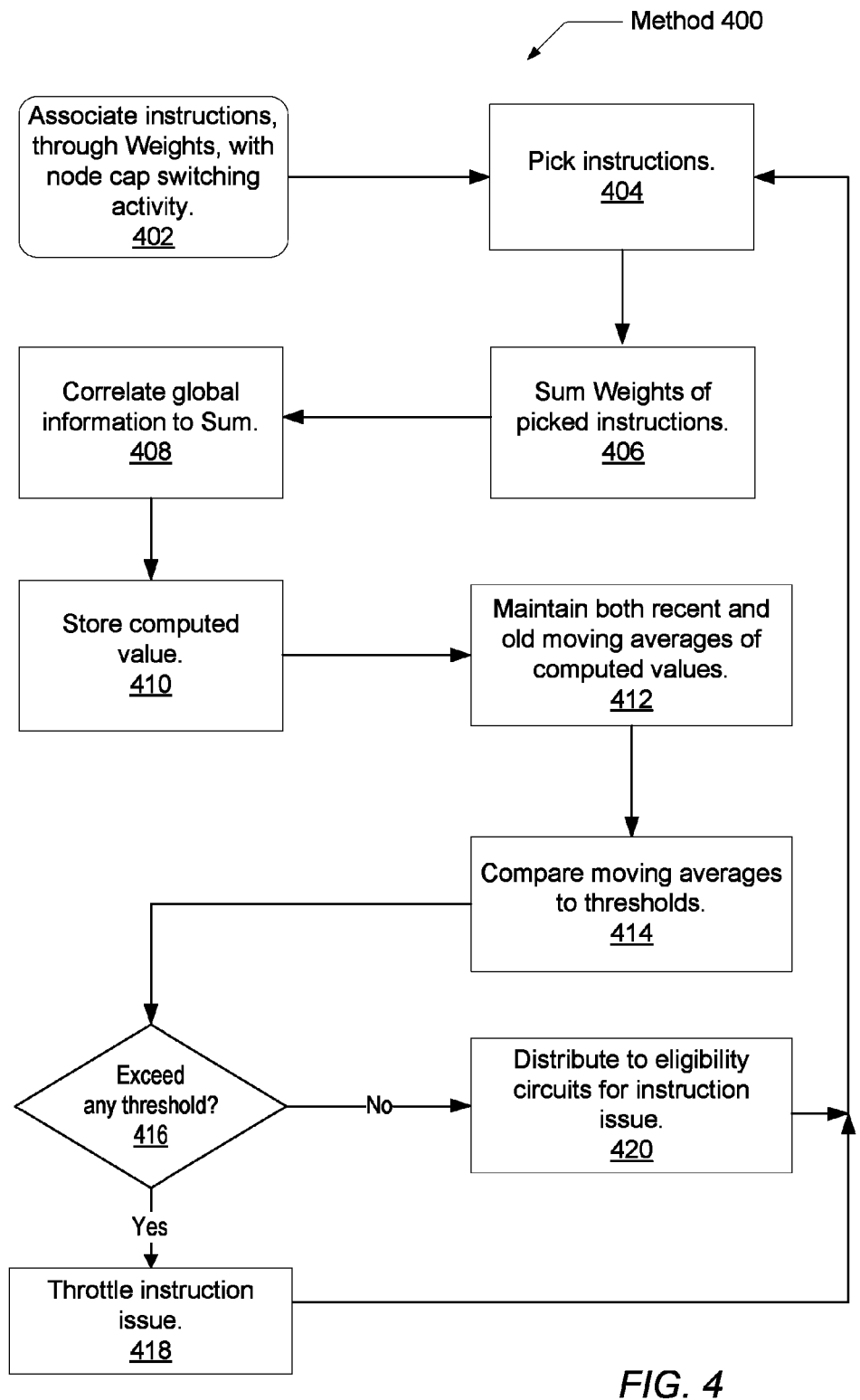
FIG. 4 is a general block diagram illustrating one embodiment of a method for digital real-time voltage droop detection and reduction.

FIG. 4 illustrates one embodiment of a method 400 for digital real-time voltage droop detection and reduction. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a semiconductor chip is floorplanned and individual blocks and cells are placed and designed according to the floorplan. A core may be the entire chip or a portion of the chip. As stated earlier, the core may be any IC. In one embodiment, the core may be a processor core. In another embodiment, the core may be an ASIC or other semiconductor chip.

Instructions may be assigned to groups in block 402. The assignment of the groups may be performed by instruction type such as arithmetic instructions are placed in one group, control flow instructions in another group, and so forth. This type of grouping assumes the total node capacitance switching behavior is similar among the instruction in a group. During power modeling of the pre-silicon design, if the switching activity of an instruction is found to vary beyond a predetermined threshold from other instructions in its group, then that particular instruction may be moved to another group with similar switching activities. Afterwards, a single weight value, which may be arbitrary, is assigned to each group. The weights should be relative to one another and track the node capacitance switching activity of their respective instructions. The number of groups and the weight values may be tunable parameters during a power characterization stage of the semiconductor chip design. For example, these two values may be set after iterations of a pre-silicon power modeling simulator.

In block 404, a scheduler, such as Scheduler 220, may pick instructions for execution. The criteria for determining the number of instructions to pick and which instructions to pick from a reservation station or other queue was described above regarding FIG. 2 and Scheduler 220.

In block 406, the corresponding weight values for the picked individual instructions are summed together to produce a local sum. Modern designs typically have multi-cores. Global information from other cores, such as the total sum of the weight values from their respective cores, may be correlated with the local sum in block 408. In some cases, the global metal wire routes may have a substantial delay in delivering the global value(s) to the local core. In such a case, the global value(s) may correspond to instructions picked in the global core(s) one or more clock cycles, or pipe stages, earlier. However, the effect of the global correlation may not be diminished by this fact. The local sum is likewise routed to the global core(s) in order to be correlated with the sum(s) in those core(s).

In one embodiment, the correlation of the global sum with the local sum may be an arithmetic addition to create a new sum. In other embodiments, another hashing function may be used such as concatenation or a combinatorial logic function. In block 410, the computed value from the hashing function, which may be an arithmetic adder or other, is stored. The computed value may be stored in a queue, such as a FIFO. The FIFO may store a history of computed values that may be later used to track circuit behavior regarding node switching activity via the correlated weight values of instructions as described next.

For example, in block 412, stored values in the FIFO may be used to determine both a recent history and an older history of current consumption of the core. For the recent history of current consumption, in one embodiment, the current computed value derived from the local and global weight sums, which is to be stored in the FIFO, may be combined with a chosen stored value in the FIFO by means of another hashing function. For example, this second hashing function, in one embodiment, may sum the current computed value and the previous output of the hashing function and then subtract the chosen stored value in the FIFO. In other embodiments, a different hashing function may be chosen in order to track the recent trend of current consumption by the core. The output of this second hashing function is the recent moving average that may be used to track the recent history of current consumption of the core. Similarly, a third hashing function may be used to track an older trend of current consumption by the core. In one embodiment, the arithmetic and combinatorial logic of the third hashing function may be the same as the second hashing function. However, the inputs may change from the current computed value to the chosen stored value in the FIFO and from the chosen stored value in the FIFO to an older stored value in the FIFO. In one embodiment, the chosen stored value may be an entry in the middle of the FIFO and the older stored value may be the entry about to exit the FIFO. The output of this third hashing function is the old moving average that may be used to track the old history of current consumption of the core.

In block 414, outputs of the second and third hashing functions are combined with predetermined thresholds. For example, in one embodiment, a difference may be calculated between the outputs of the hashing functions. This difference may be used to predict an upcoming voltage droop. This difference may be compared to a predetermined threshold. This threshold may be a tunable parameter during a power characterization stage of the semiconductor chip design. For example, this value may be set after iterations of a pre-silicon power modeling simulator. If the difference exceeds this threshold (conditional block 416), instruction issue is reduced, or throttled, during the same or a subsequent clock cycle in block 418. For example, in one embodiment, no instructions may be issued in the corresponding clock cycle. Control flow returns to block 404.

In one embodiment, a second comparison may be performed between the output of the second hashing function, which tracks the recent moving average and a second predetermined threshold. This second threshold also may be a tunable parameter during a power characterization stage of the semiconductor chip design. If the recent moving average exceeds this threshold (conditional block 416), instruction issue is reduced, or throttled, during the same or a subsequent clock cycle in block 418. For example, in one embodiment, no instructions may be issued in the corresponding clock cycle. In an alternative embodiment, half of the instructions may be throttled. For example, for a 4-way superscalar processor core, 2 instructions may be throttled, while 2 instructions may be issued if they are found to be eligible by the eligibility circuitry. The choice of which 2 instructions to throttle may be random. Alternatively, complex circuitry may be used to make a choice based on other factors such as the respective weights. In other embodiments, a finer granularity may be used such as multiple thresholds that determine if 1, 2, 3 or 4 instructions should be throttled. This instruction issue throttling reduces current consumption on the die and may prevent voltage droop and its negative electrical effects from occurring. Control flow returns to block 404.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. A processor comprising:
a cache configured to store instructions;
an instruction fetch unit;
control logic configured to pick a first plurality of instructions; and
a scheduler configured to:
maintain an activity level weight table including a plurality of predetermined weight values, wherein each of said weight values represents an estimated amount of node capacitance switching within the processor that would be caused by execution of one or more corresponding instructions, and wherein an activity level of one or more instructions is based upon one or more of the weight values;
associate a first activity level based upon one or more weights from the table with the first plurality of instructions;
read a previously determined and stored second activity level associated with a second plurality of instructions;
determine a first average node switching capacitance based upon the first activity level and the second activity level;
issue a first number of said plurality of instructions in response to determining the first average is less than a first threshold; and
throttle instruction issue by issuing a second number of said plurality of instructions in response to determining the first average is greater than the first threshold, wherein said second number is less than said first number.

2. The processor as recited in claim 1, wherein the scheduler is further configured to:
read a previously determined and stored third activity level associated with a third plurality of instructions, wherein the third activity level corresponds to an estimated level of node capacitance switching activity associated with the third plurality of instructions, wherein the third plurality of instructions are older than the second plurality of instructions;
determine a second average node capacitance switching activity level based upon the second activity level and the third activity level;
issue the first number of said plurality of instructions in response to further determining a difference between the first average and the second average is less than a second threshold; and
throttle instruction issue by issuing a third number of said plurality of instructions in response to further determining the difference is greater than the second threshold, wherein said third number is less than said first number.

3. The processor as recited in claim 2, wherein the scheduler is further configured to determine each of the first average and the second average further based upon a previously determined and stored first average and second average, respectively.

4. The processor as recited in claim 1, wherein each estimated level of node capacitance switching activity is based upon a pre-silicon power modeling analysis of the processor.

5. The processor as recited in claim 4, wherein the scheduler is further configured to:
store a weight value for each instruction of an instruction set for the processor, wherein the weight value is translated from a corresponding estimated level of node capacitance switching activity and the weight value has less granularity than the corresponding estimated level of node capacitance switching activity; and
determine the first activity level using stored weight values corresponding to the first plurality of instructions.

6. The processor as recited in claim 5, wherein a first weight value corresponds to a first group of instructions within the instruction set and a second weight value corresponds to a second group of instructions within the instruction set, wherein the second group of instructions is different from the first group of instructions.

7. The processor as recited in claim 3, wherein the first average is further based upon a fourth activity level, wherein the fourth activity level corresponds to an estimated level of node capacitance switching activity associated with a fourth plurality of instructions from corresponding schedulers of other processor cores.

8. A method comprising:
picking first plurality of instructions;
maintaining an activity level weight table including a plurality of predetermined weight values, wherein each of said weight values represents an estimated amount of node capacitance switching within the processor that would be caused by execution of one or more corresponding instructions, and wherein an activity level of one or more instructions is based upon one or more of the weight values;
associating a first activity level based upon one or more weights from the table with the first plurality of instructions;
reading a previously determined and stored second activity level associated with a second plurality of instructions;
determining a first average node switching capacitance based upon the first activity level and the second activity level;
issuing a first number of said plurality of instructions in response to determining the first average is less than a first threshold; and
throttling instruction issue by issuing a second number of said plurality of instructions in response to determining the first average is greater than the first threshold, wherein said second number is less than said first number.

9. The method of claim 8, further comprising:
reading a previously determined and stored third activity level associated with a third plurality of instructions, wherein the third activity level corresponds to an estimated level of node capacitance switching activity associated with the third plurality of instructions, wherein the third plurality of instructions are older than the second plurality of instructions;
determining a second average node capacitance switching activity level based upon the second activity level and the third activity level;
issuing the first number of said plurality of instructions in response to further determining a difference between the first average and the second average is less than a second threshold; and
throttling instruction issue by issuing a third number of said plurality of instructions in response to further determining the difference is greater than the second threshold, wherein said third number is less than said first number.

10. The method of claim 9, further comprising determining each of the first average and the second average further based upon a previously determined and stored first average and second average, respectively.

11. The method of claim 8, wherein each estimated level of node capacitance switching activity is based upon a pre-silicon power modeling analysis of the processor.

12. The method of claim 11, further comprising:
storing a weight value for each instruction of an instruction set for the processor, wherein the weight value is translated from a corresponding estimated level of node capacitance switching activity and the weight value has less granularity than the corresponding estimated level of node capacitance switching activity; and
determining the first activity level using stored weight values corresponding to the first plurality of instructions.

13. The method of claim 12, wherein a first weight value corresponds to a first group of instructions within the instruction set and a second weight value corresponds to a second group of instructions within the instruction set, wherein the second group of instructions is different from the first group of instructions.

14. The method of claim 10, wherein the first average is further based upon a fourth activity level, wherein the fourth activity level corresponds to an estimated level of node capacitance switching activity associated with a fourth plurality of instructions from corresponding schedulers of other processor cores.

15. An instruction scheduler for use in a processor, the scheduler comprising:
circuitry configured to:
maintain an activity level weight table including a plurality of predetermined weight values, wherein each of said weight values represents an estimated amount of node capacitance switching within the processor that would be caused by execution of one or more corresponding instructions, and wherein an activity level of one or more instructions is based upon one or more of the weight values;
associate a first activity level based upon one or more weights from the table with the first plurality of instructions;
read a previously determined and stored second activity level associated with a second plurality of instructions;
determine a first average node switching capacitance based upon the first activity level and the second activity level;
issue a first number of said plurality of instructions in response to determining the first average is less than a first threshold; and
throttle instruction issue by issuing a second number of said plurality of instructions in response to determining the first average is greater than the first threshold, wherein said second number is less than said first number.

16. The instruction scheduler as recited in claim 15, wherein the circuitry is further configured to:
read a previously determined and stored third activity level associated with a third plurality of instructions, wherein the third activity level corresponds to an estimated level of node capacitance switching activity associated with the third plurality of instructions, wherein the third plurality of instructions are older than the second plurality of instructions;
determine a second average node capacitance switching activity level based upon the second activity level and the third activity level;
issue the first number of said plurality of instructions in response to further determining a difference between the first average and the second average is less than a second threshold; and
throttle instruction issue by issuing a third number of said plurality of instructions in response to further determining the difference is greater than the second threshold, wherein said third number is less than said first number.

17. The instruction scheduler as recited in claim 16, wherein the circuitry is further configured to determine each of the first average and the second average further based upon a previously determined and stored first average and second average, respectively.

* * * * *